US012606080B2

(12) United States Patent
Pan

(10) Patent No.: US 12,606,080 B2
(45) Date of Patent: Apr. 21, 2026

(54) SAFETY RATCHET STRAP TENSIONER

(71) Applicant: NINGBO EASYLIFTING IMPORT AND EXPORT CO., LTD, Ningbo (CN)

(72) Inventor: Yancheng Pan, Ningbo (CN)

(73) Assignee: NINGBO EASYLIFTING IMPORT AND EXPORT CO., LTD, Ningbo (CN)

( * ) Notice: Subject to any disclaimer, the term of this patent is extended or adjusted under 35 U.S.C. 154(b) by 343 days.

(21) Appl. No.: 18/429,900

(22) Filed: Feb. 1, 2024

(65) Prior Publication Data

US 2025/0187526 A1      Jun. 12, 2025

(30) Foreign Application Priority Data

Dec. 6, 2023    (CN) .......................... 202323321036.3

(51) Int. Cl.
 *B60P 7/08*          (2006.01)
(52) U.S. Cl.
 CPC .................................... *B60P 7/083* (2013.01)
(58) Field of Classification Search
 CPC ....................................................... B60P 7/083
 See application file for complete search history.

(56) References Cited

U.S. PATENT DOCUMENTS

| | | | | |
|---|---|---|---|---|
| 7,350,767 B2 * | 4/2008 | Huang | .................... | B60P 7/083 254/218 |
| 10,150,403 B2 * | 12/2018 | Xu | .......................... | B65B 13/22 |
| 12,318,894 B1 * | 6/2025 | Jin | .......................... | B25B 25/00 |
| 12,508,975 B2 * | 12/2025 | Chen | ...................... | B60P 7/083 |
| 2026/0014925 A1 * | 1/2026 | Chen | ...................... | B60P 7/083 |

* cited by examiner

*Primary Examiner* — Faye M Fleming
(74) *Attorney, Agent, or Firm* — Ladas & Parry, LLP

(57)          ABSTRACT

The disclosure discloses a safety ratchet strap tensioner, including a fastening seat, a fastening flange plate, a pulling handle, a pulling flange plate, a ratchet, a ratchet shaft, and the like. The disclosure is mainly to add a damping assembly on a side of the ratchet shaft. When elastic potential energy accumulated on the ratchet shaft drives the ratchet to quickly rotate forward, to quickly wind a winding end of a tensioning strap on the ratchet shaft layer by layer to form fast strap retracting, after the fast strap retracting drives a binding end of the tensioning strap to be close to the tensioner, that is, when there is still a short distance between the binding end and the tensioner and the strap is not completely retracted, the damping assembly may quickly restrict the ratchet to stopping rotating and winding to stop the strap retracting, thereby preventing a hook on the binding end from directly hitting or hooking a user's arm or even face as the binding end is thrown around driven by a fast strap retracting force, effectively eliminating the potential safety hazard in the fast strap retracting process, and ensuring that the fast strap retracting process of the tensioning strap is safer.

10 Claims, 15 Drawing Sheets

SAFETY RATCHET STRAP TENSIONER

CROSS-REFERENCE TO RELATED APPLICATION

The present disclosure relates to and claims priority to Chinese patent application No. CN 202323321036.3 filed on Dec. 6, 2023 in China, the disclosure of which is incorporated herein by reference in its entirety.

TECHNICAL FIELD

The disclosure relates to a ratchet strap tensioner configured to quickly tension straps for binding goods, and in particular, to a safety ratchet strap tensioner.

BACKGROUND

During transportation of goods, it is often necessary to use a ratchet strap tensioner to assist straps in fastening the goods, thereby preventing the goods from falling due to bumps in the transportation process. Structures of current ratchet strap tensioners are mostly formed by a fastening seat, a fastening flange plate at a front portion of the fastening seat, a pulling handle, a pulling flange plate at a front portion of the pulling handle, a ratchet having a ratchet shaft, and the like. The ratchet is coaxially rotatably mounted with pulling axes of the fastening flange plate and the pulling flange plate through the ratchet shaft. The structures further include a fixed strap connected to the fastening seat, and a tensioning strap of which one end is wound and connected to the ratchet shaft of the ratchet as a winding end and the other end forms a binding end, where a clamping member that elastically pushes and is in contact with an outer circumference of the pulling flange plate is further arranged in the fastening seat, and a stopping member that elastically pushes and is in contact with an outer circumference of the fastening flange plate is further arranged in the pulling handle.

During working, when both the clamping member and the stopping member are clamped with the ratchet, the ratchet is pulled by opening and closing of the pulling handle relative to the fastening seat to form one-way intermittent forward rotation, to wind the winding end of the tensioning strap on the ratchet shaft layer by layer to form slow strap retracting and tensioning. This action process is a process of binding the goods and applying a strap tensioning force. When the clamping member and the stopping member are completely separated from the ratchet, and an outward pulling force is applied to the binding end of the tensioning strap, the ratchet is driven to quickly rotate reversely, to quickly rotate and release the winding end wound on the ratchet shaft layer by layer to form fast strap releasing. This action process is a process of quickly pulling the strap out to a certain distance to facilitate the goods binding, and in this action process, elastic potential energy is also synchronously accumulated on the ratchet shaft. Subsequently, if fast strap retracting needs to be performed on the pulled-out strap, it is only necessary to cancel the outward pulling force applied to the binding end of the tensioning strap, and ensure that the clamping member and stopping member are still completely separated from the ratchet. In this case, the elastic potential energy synchronously accumulated on the ratchet shaft can be used to drive the ratchet to quickly rotate forward, to quickly wind the winding end of the tensioning strap on the ratchet shaft layer by layer to form fast strap retracting.

However, in actual use, a user often encounters the following case: because the ratchet driven by the elastic potential energy rotates very fast, after the fast strap retracting drives the binding end of the tensioning strap to be close to the tensioner, if there is no damping restriction on the ratchet, in the process of directly retracting all the binding end by relying on the original ratchet speed, the binding end close to the tensioner will often be driven to form disorderly throwing; and a hook for facilitating connection is usually further arranged at the binding end, so that driven by a fast strap retracting force, the hook will directly hit or hook the user's arm or even face as the binding end is thrown around. It is obvious that there is a huge potential safety hazard in the fast strap retracting process.

SUMMARY

A technical problem to be resolved by the disclosure is to overcome defects in the prior art and provide a safety ratchet strap tensioner that can make a fast strap retracting process of a tensioning strap safer.

The technical problem of the disclosure is resolved by the following technical solutions: A safety ratchet strap tensioner is provided, including a fastening seat, a fastening flange plate at a front portion of the fastening seat, a pulling handle, a pulling flange plate at a front portion of the pulling handle, and a ratchet having a ratchet shaft, where the ratchet is coaxially rotatably mounted with pulling axes of the fastening flange plate and the pulling flange plate through the ratchet shaft. The safety ratchet strap tensioner further includes a fixed strap connected to the fastening seat, and a tensioning strap of which one end is wound and connected to the ratchet shaft of the ratchet as a winding end and the other end forms a binding end, where a clamping member that elastically pushes and is in contact with an outer circumference of the pulling flange plate is arranged in the fastening seat, and a stopping member that elastically pushes and is in contact with an outer circumference of the fastening flange plate is arranged in the pulling handle; both the clamping member and the stopping member are clamped with the ratchet, and the ratchet is pulled by continuous reciprocating opening and closing of the pulling handle relative to the fastening seat to form one-way intermittent forward rotation, to wind the winding end of the tensioning strap on the ratchet shaft layer by layer to form slow strap retracting and tensioning; the clamping member and the stopping member are completely separated from the ratchet, and the binding end of the tensioning strap applies an outward pulling force to drive the ratchet to quickly rotate reversely, to quickly rotate and release the winding end wound on the ratchet shaft layer by layer to form fast strap releasing, and synchronously accumulate elastic potential energy on the ratchet shaft, where a damping assembly is arranged on a side of the ratchet shaft, the elastic potential energy synchronously accumulated on the ratchet shaft drives the ratchet to quickly rotate forward, to quickly wind the winding end of the tensioning strap on the ratchet shaft layer by layer to form fast strap retracting, and after the fast strap retracting drives the binding end of the tensioning strap to be close to the tensioner, the damping assembly quickly restricts the ratchet to stopping rotating and winding to stop the strap retracting.

The damping assembly includes a damping plate or damping sheet or damping wheel or damping block arranged on a front side of the ratchet shaft, the damping assembly is elastically pushed to be bonded to the winding end wound on the ratchet shaft layer by layer, and a bonding force of the damping assembly increases as a thickness of winding layers of the winding end on the ratchet shaft increases, until the bonding force of the damping assembly completely restricts the ratchet to stopping rotating and winding to stop the strap retracting.

A lower end of the damping plate is provided with a mounting hole, an upper end of the damping plate is bent outward to form a pulling end, and a bent portion of the damping plate forms a damping convex protruding toward the ratchet shaft; the damping plate is coaxially mounted with a damping torsion spring through the mounting hole at the lower end, and the damping torsion spring elastically pushes the damping plate, to drive the damping convex to be bonded to the winding end wound on the ratchet shaft layer by layer; and the pulling end pulls outward to overcome an elastic thrust force of the damping torsion spring, and drive the damping convex to be separated from the winding end wound on the ratchet shaft layer by layer, and the winding end continues to be wound on the ratchet shaft driven by the elastic potential energy on the ratchet shaft.

A sheath fixed by sleeving is arranged on a front side of the fastening flange plate, the sheath is provided with a strap pass-through hole for the binding end to freely pass through, a limiting plate is arranged at a top portion of the sheath, and the limiting plate restricts an outward pulling stroke of the pulling end.

A sliding groove higher than the ratchet is provided at a rear portion of the outer circumference of the fastening flange plate, and a locking inclined surface and a pushing inclined surface that are integrally connected are provided in the sliding groove; a rear cam higher than the ratchet is arranged at a rear portion of the outer circumference of the pulling flange plate; the stopping member elastically pushes and is in contact with the interior of the sliding groove, and the pulling handle is closed and pressed relative to the fastening seat, to drive the stopping member to slide from the locking inclined surface to the pushing inclined surface to be separated from the ratchet, the clamping member is synchronously pushed by the rear cam to be also separated from the ratchet, and the ratchet freely rotates; and the pulling handle is released and pressed relative to the fastening seat, the pulling handle is reset and rises, to drive the stopping member to slide from the pushing inclined surface to the locking inclined surface to be meshed with the ratchet, the clamping member is synchronously separated from the rear cam and is also meshed with the ratchet, and the ratchet is restricted from rotation.

A front cam and a bump that are higher than the ratchet are arranged at a front portion of the outer circumference of the pulling flange plate, a reset torsion spring is arranged on a front side of the bump, and the reset torsion spring elastically presses down the bump to drive the pulling handle to rise and be reset.

A top arc groove higher than the ratchet is provided at a front portion of the outer circumference of the fastening flange plate, a front baffle wall is arranged on a front side of the top arc groove, a pulling arc groove lower than the top arc groove and the ratchet is provided at a middle portion of the outer circumference of the fastening flange plate, and a lock groove higher than the ratchet is provided between the pulling arc groove and the sliding groove.

The pulling handle rotates to be opened relative to the fastening seat, the stopping member elastically pushes and is in contact with the interior of the top arc groove to be separated from the ratchet, the corresponding clamping member is synchronously pushed by the front cam to be also separated from the ratchet, and the ratchet freely rotates.

The stopping member elastically pushes and is in contact with the interior of the lock groove, the corresponding clamping member is meshed with the ratchet, and the pulling handle is incapable of being pulled to rotate relative to the fastening seat.

The stopping member elastically pushes and is in contact with the interior of the pulling arc groove to be meshed with the ratchet, the corresponding clamping member is synchronously meshed with the ratchet, the pulling handle and the fastening seat perform continuous reciprocating opening and closing pulling around the pulling axes, and cooperation between the stopping member and the clamping member drives the ratchet to form one-way intermittent forward rotation, to wind the winding end of the tensioning strap on the ratchet shaft layer by layer to form slow strap retracting and tensioning.

Compared with the prior art, the disclosure is mainly to add a damping assembly on a side of the ratchet shaft. When the elastic potential energy accumulated on the ratchet shaft drives the ratchet to quickly rotate forward, to quickly wind the winding end of the tensioning strap on the ratchet shaft layer by layer to form fast strap retracting, after the fast strap retracting drives the binding end of the tensioning strap to be close to the tensioner, that is, when there is still a short distance between the binding end and the tensioner and the strap is not completely retracted, the damping assembly may quickly restrict the ratchet to stopping rotating and winding to stop the strap retracting, thereby preventing a hook on the binding end from directly hitting or hooking a user's arm or even face as the binding end is thrown around driven by a fast strap retracting force, effectively eliminating the potential safety hazard in the fast strap retracting process, and ensuring that the fast strap retracting process of the tensioning strap is safer.

DETAILED DESCRIPTION

Figure 1:
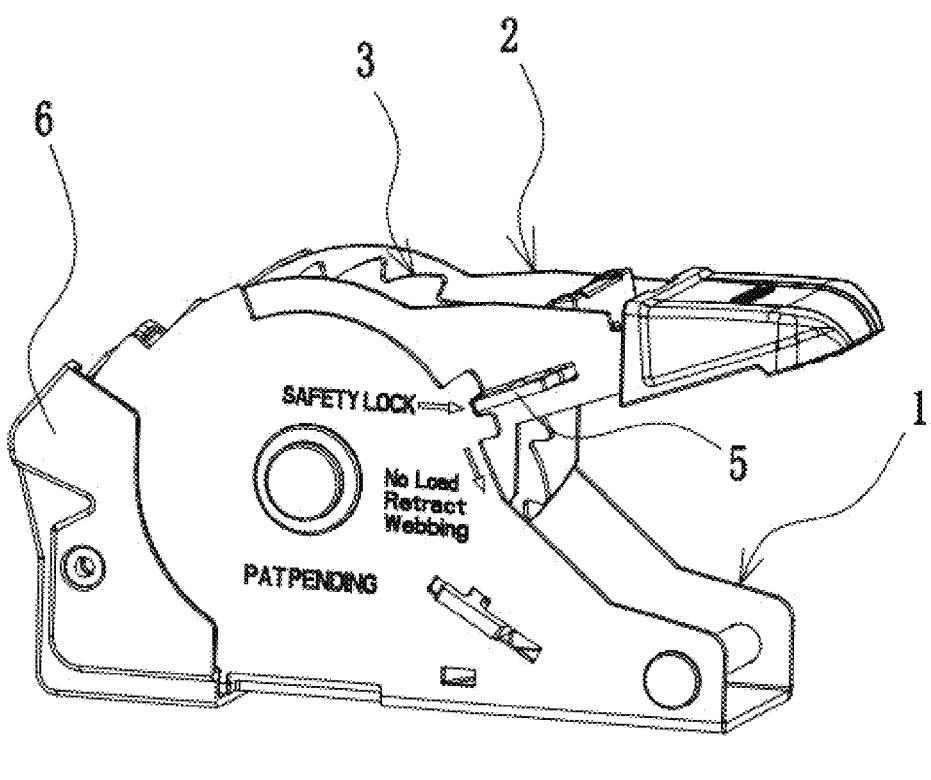
FIG. 1 is a schematic structural diagram of the disclosure in a first view direction.

The embodiments of the disclosure are further described in detail below with reference to the foregoing accompanying drawings.

Reference numerals shown in FIG. 1 to FIG. 15 are as follows: 1. fastening seat, 11. guide rod, 111. damping torsion spring, 12. mounting rod, 121. fixed strap, 13. pulling arc groove, 14. lock groove, 15. sliding groove, 151. locking inclined surface, 152. pushing inclined surface, 16. boss, 17. top arc groove, 18. hook, 101. fastening flange plate, 102. panel, 103. clamping member sliding groove, 2. pulling handle, 21. front cam, 22. rear cam, 23. handle, 24. bump, 25. pulling flange plate, 26. stopping member sliding groove, 3. ratchet, 31. ratchet shaft, 32. mandrel, 33. tensioning strap, 331. winding end, 332. binding end, 4. clamping member, 5. stopping member, 6. sheath, 61. strap pass-through hole, 62. limiting plate, 7. coil spring assembly, 8. reset torsion spring, 9. damping plate, 91. mounting hole, 92. pulling end, 93. damping convex, 10. spring.

A safety ratchet strap tensioner, as shown in FIG. 1 to FIG. 8, is a small ratchet-type auxiliary binding tool configured to bind and tighten goods quickly and effortlessly, and the structure thereof is mainly formed by a fastening seat 1, a pulling handle 2, a ratchet 3, a fixed strap 121, a tensioning strap 33, and the like.

Figure 9:
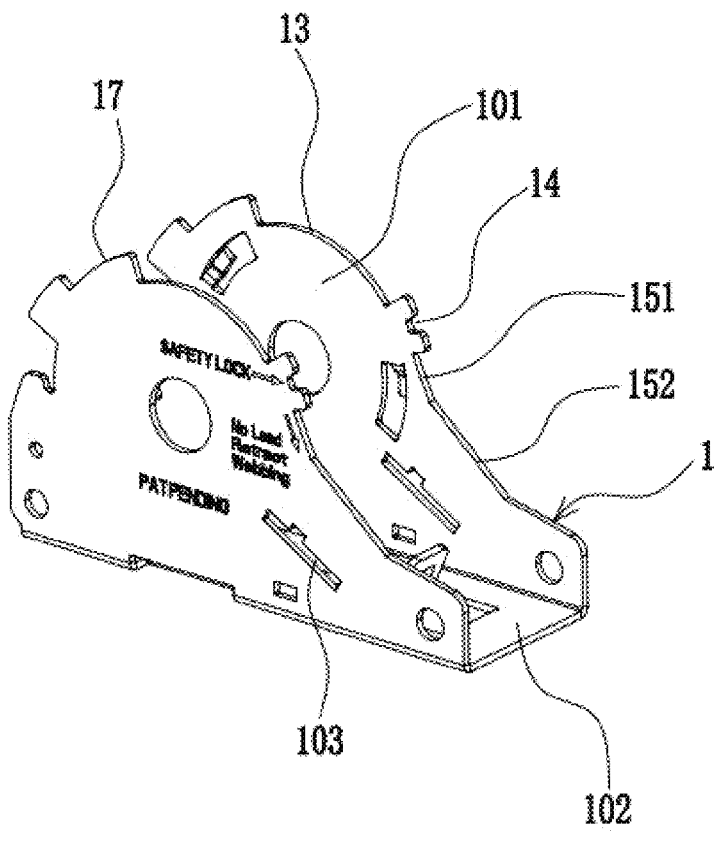
FIG. 9 is a schematic structural diagram of a fastening seat in a first view direction.
Figure 10:
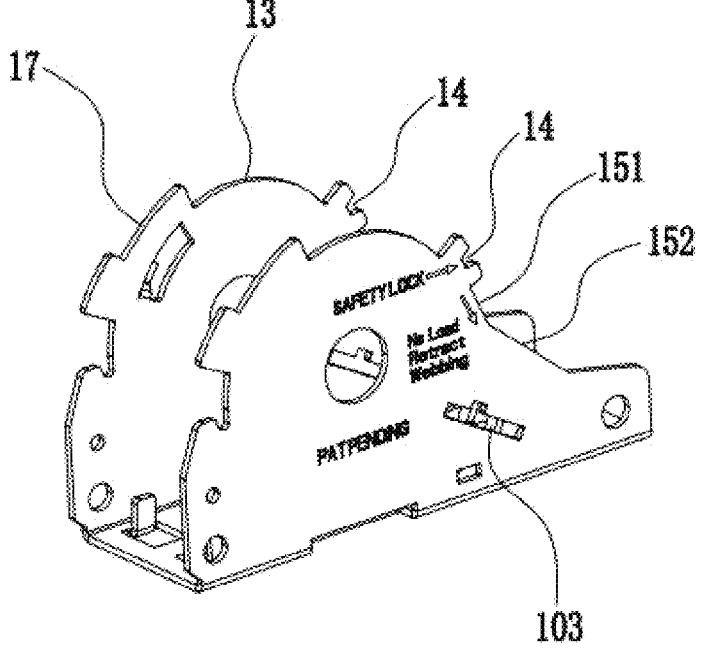
FIG. 10 is a schematic structural diagram of a fastening seat in a second view direction.

The fastening seat 1 is shown in FIG. 9 and FIG. 10, and includes a bottom plate and two side plates that are respectively bent vertically upward on two sides of the bottom plate, thereby forming a structural component of which the cross section is "U"-shaped. Fastening flange plates 101 are formed at front ends of the two side plates, that is, the left end shown in FIG. 9. The center of each fastening flange plate is provided with a shaft hole. The shaft holes on two the fastening flange plates 101 are exactly on the same horizontal axis.

A front end of the fastening seat 1 is provided with a guide rod 11 fixedly connected between the two fastening flange plates 101 and a plastic sheath 6 fixed on front sides of the two fastening flange plates 101 by sleeving. The sheath is provided with a rectangular strap pass-through hole 61, and the position of the strap pass-through hole is close to a bottom portion of the sheath 6, thereby allowing the binding end 332 to pass through freely. The sheath 6 can also have a cushioning and protection effect when the fastening seat 1 is bumped.

A rear end of the fastening seat 1, that is, the right end shown in FIG. 9 and FIG. 10, is provided with a mounting rod 12 fixedly connected between the two side plates, and a panel 102 arranged on a bottom surface at a rear portion of the fastening seat 1 and located below the mounting rod. The panel can be comfortably touched by fingers. A fixedly connected fixed strap 121 is arranged on the mounting rod 12, and a hook 18 for connection is arranged at an end portion of the fixed strap, to facilitate hooking and binding.

Outer circumferences of the two fastening flange plates 101 respectively adopt a completely symmetrical structural design, which is specifically: A top arc groove 17 higher than the ratchet 3 is provided at a front portion of the outer circumference of each fastening flange plate 101, a front baffle wall is arranged on a front side of the top arc groove 17, a pulling arc groove 13 lower than the top arc groove 17 and the ratchet 3 is provided at a middle portion of the outer circumference of each fastening flange plate 101, a sliding groove 15 higher than the ratchet 3 is provided at a rear portion of the outer circumference of each fastening flange plate 101, and a lock groove 14 higher than the ratchet 3 is further provided between the pulling arc groove 13 and the sliding groove 15.

In addition, the lock groove 14 is mainly provided on a boss 16 between the pulling arc groove 13 and the sliding groove 15, and the lock groove 14 is higher than the pulling arc groove 13 and the sliding groove 15. A front side wall of the boss 16 serves as a rear baffle wall of the pulling arc groove 13, and a rear side wall of the boss 16 serves as a front baffle wall of the sliding groove 15.

A locking inclined surface 151 and a pushing inclined surface 152 that are integrally connected in a front-rear direction are provided in the sliding groove 15, and an inclination of the locking inclined surface 151 is greater than that of the pushing inclined surface 152.

Figure 11:
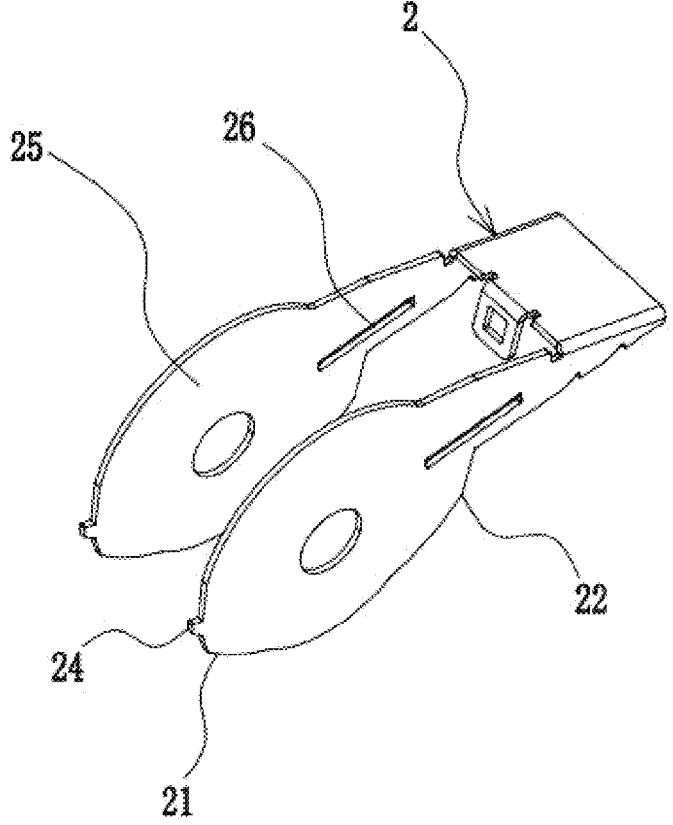
FIG. 11 is a schematic structural diagram of a pulling handle.

The pulling handle 2 is shown in FIG. 11, and includes a top plate and two backing plates that are respectively bent vertically downward on the top plate, thereby forming a structural component of which the cross section is inverted-"U"-shaped. Pulling flange plates 25 are formed at front ends of the two backing plates. The center of each pulling flange plate is provided with a shaft hole. The shaft holes on the two pulling flange plates 25 are exactly on the same horizontal axis. A plastic handle 23 is mounted at rear ends of the two backing plates, to improve the comfortability during operation of the pulling handle 2.

A front cam 21 and a bump 24 that are higher than the ratchet 3 are arranged at a front portion of the outer circumference of the pulling flange plate 25. A reset torsion spring 8 is arranged on a front side of the bump, the reset torsion spring is arranged in the sheath 6 in a hidden manner, and the reset torsion spring 8 elastically presses down the bump 24 to form a tendency that can drive the pulling handle 2 to rise. A rear cam 22 higher than the ratchet 3 is arranged at a rear portion of the outer circumference of the pulling flange plate 25.

The ratchet 3 is formed by a ratchet shaft 31 and ratchet sheets fixedly mounted at two ends of the ratchet shaft. The ratchet 3 is first mounted between the two pulling flange plates 25, and the two pulling flange plates are then mounted between the two fastening flange plates 101. In addition, a mandrel 32 is arranged in the ratchet shaft 31. Two ends of the mandrel are respectively supported in shaft holes of the fastening seat 1 and the pulling handle 2, thereby forming a rotation structure of the ratchet 3. In this case, the mandrel 32 is also pulling axes of the fastening flange plate 101 and the pulling flange plate 25. That is, the ratchet 3 is coaxially rotatably mounted with the pulling axes of the fastening flange plate 101 and the pulling flange plate 25 through the ratchet shaft 31.

One end of the tensioning strap 33 is tightly connected to the ratchet shaft 31, and as the ratchet 3 rotates, the one end of the tensioning strap will be wound and connected to the ratchet shaft 31 layer by layer to serve as a winding end 331. A coil spring assembly 7 is further arranged on a side of the ratchet 3. Under normal circumstances, the elastic potential energy of the coil spring assembly 7 formed during strap releasing can be used to always drive the ratchet shaft 31 to rotate and wind the winding end 331 of tensioning strap 33. The other end of the tensioning strap 33 sequentially passes through between the guide rod 11 and the bottom plate and the strap pass-through hole 61 on the sheath 6 at the front end of the fastening seat 1 to form a binding end 332. The binding end is also provided with a hook 18 for connection, to facilitate hooking and binding. Therefore, the structural design of the guide rod 11 and the strap pass-through hole 61 can guide the smooth outward fast pulling for strap releasing or fast winding for strap retracting of the binding end 332, thereby preventing the tensioning strap 33 from knotting, twisting, and other unfavorable phenomena.

A clamping member 4 is arranged between the two side plates of the fastening seat 1. Two ends of the clamping member are respectively slidably assembled in a clamping member sliding groove 103 of the two side plates. A rear end of the clamping member 4 is provided with a spring 10 for providing pushing, so that under normal conditions, the clamping member 4 has a tendency of elastic pushing and sliding forward under the action of a spring thrust force, and can always elastically push and be in contact with the outer circumference of the pulling flange plate 25.

A stopping member 5 is arranged between the two pulling flange plates 25 of the pulling handle 2, and two ends of the stopping member are respectively slidably assembled in a stopping member sliding groove 26 of the two backing plates. A rear end of the stopping member 5 is also provided with a spring 10 for providing pushing, so that under normal circumstances, the stopping member 5 has a tendency of elastic pushing and sliding forward under the action of a spring thrust force, and can always elastically push and be in contact with the outer circumference of the fastening flange plate 101.

Therefore, the fastening seat 1, the clamping member 4, the pulling handle 2, the stopping member 5, and the ratchet 3 exactly constitute a typical set of ratchet operating mechanism, and the top arc groove 17, the pulling arc groove 13, the lock groove 14, and the sliding groove 15 provided on the fastening flange plate 101 also respectively correspond to four working gears of the ratchet tensioner, which are fully out-of-gear, pulling gear, locking gear, and sliding gear.

Figure 2:
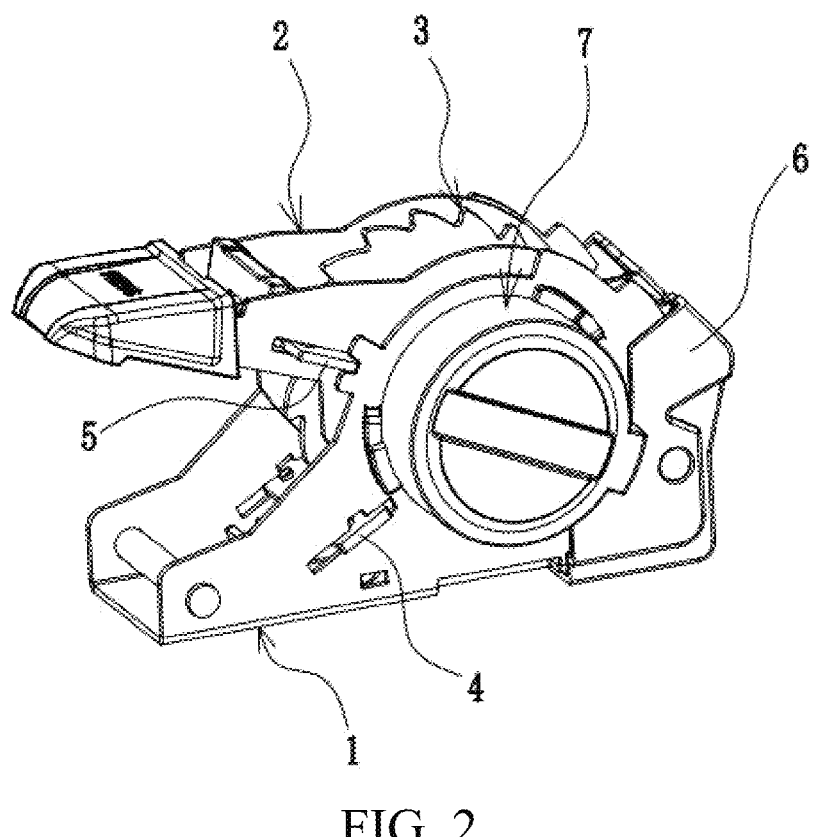
FIG. 2 is a schematic structural diagram of the disclosure in a second view direction.
Figure 3:
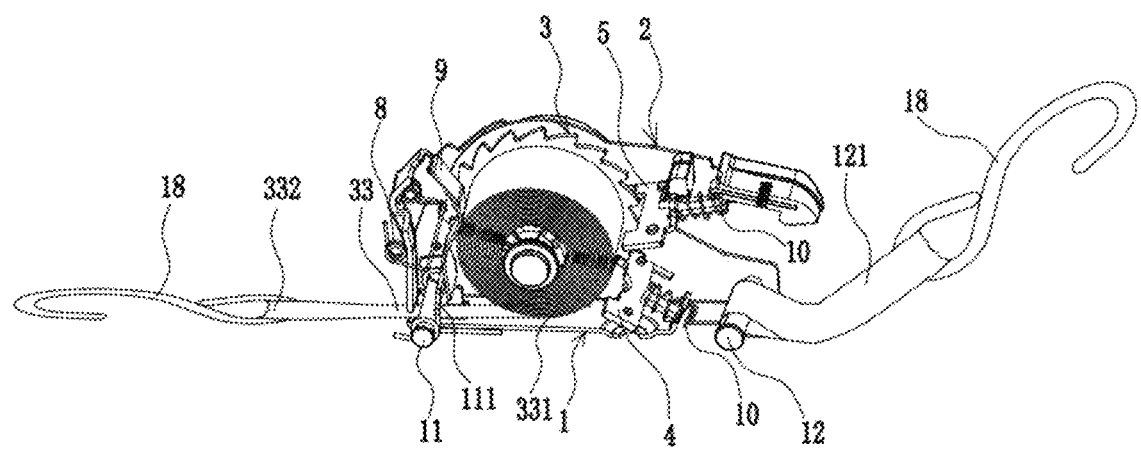
FIG. 3 is a schematic diagram of a half-section structure of FIG. 1 (where a fixed strap and a tensioning strap are mounted)
Figure 4:
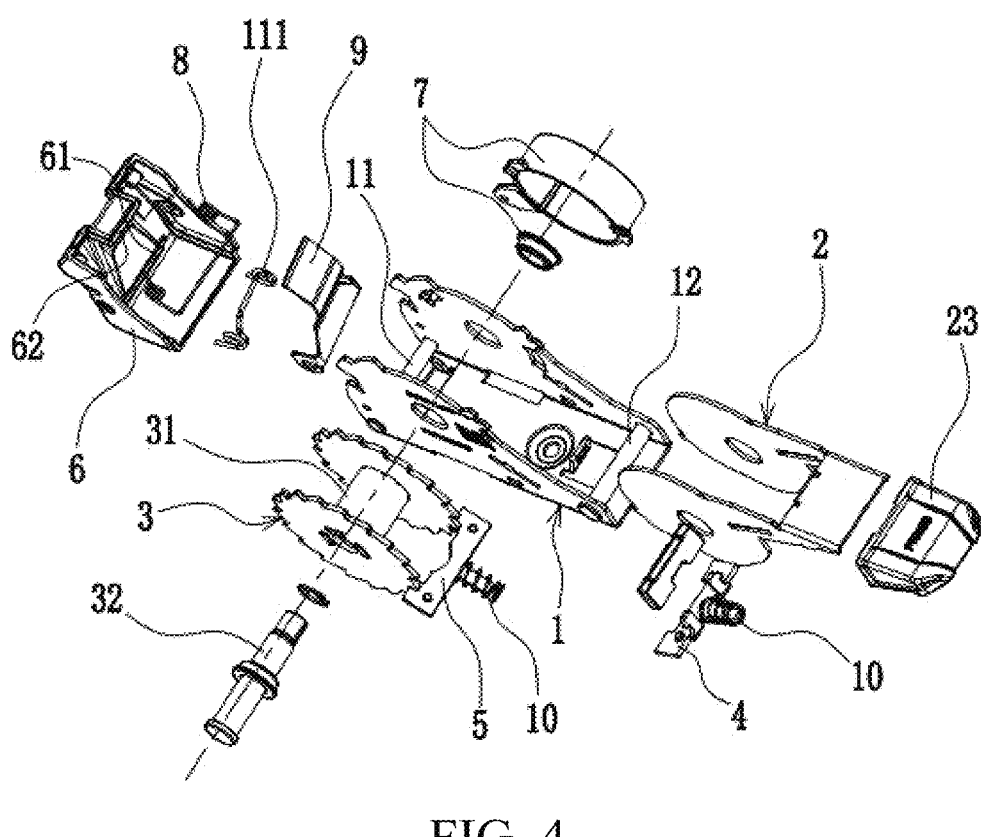
FIG. 4 is a three-dimensional exploded view of FIG. 1.
Figure 5:
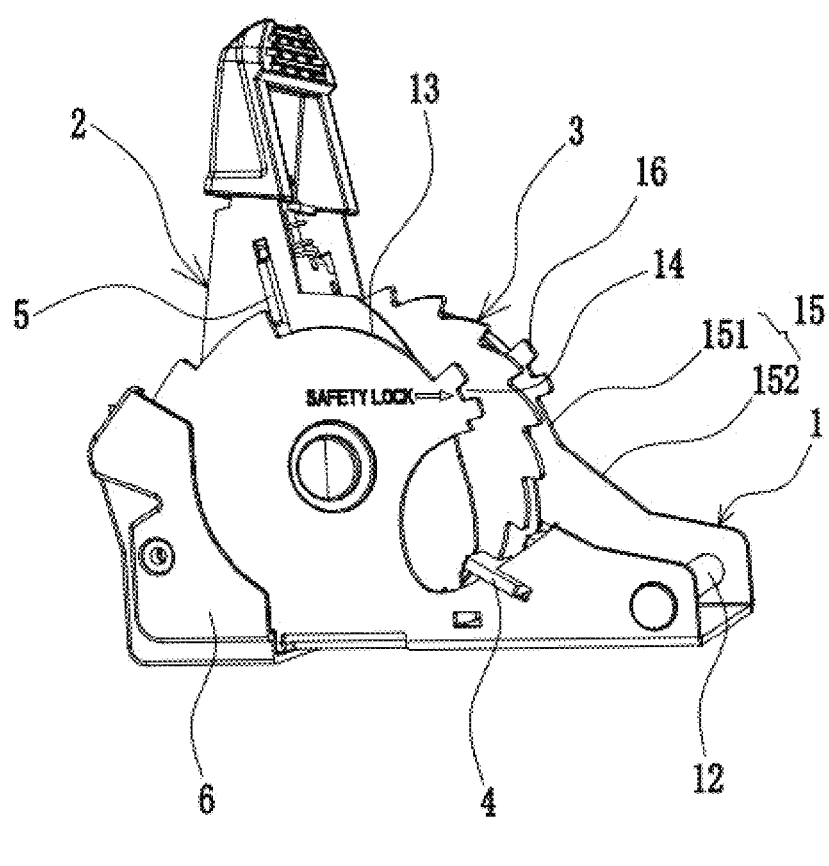
FIG. 5 is a schematic structural diagram in which a baffle plate elastically pushes and is in contact with a front side of a pulling arc groove.
Figure 6:
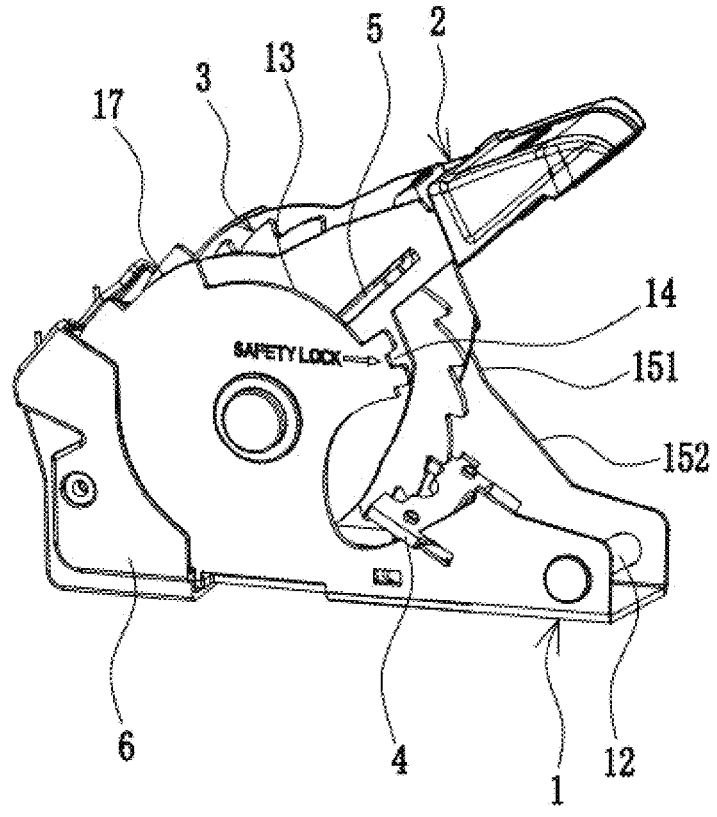
FIG. 6 is a schematic structural diagram in which a baffle plate elastically pushes and is in contact with a rear side of a pulling arc groove.
Figure 7:
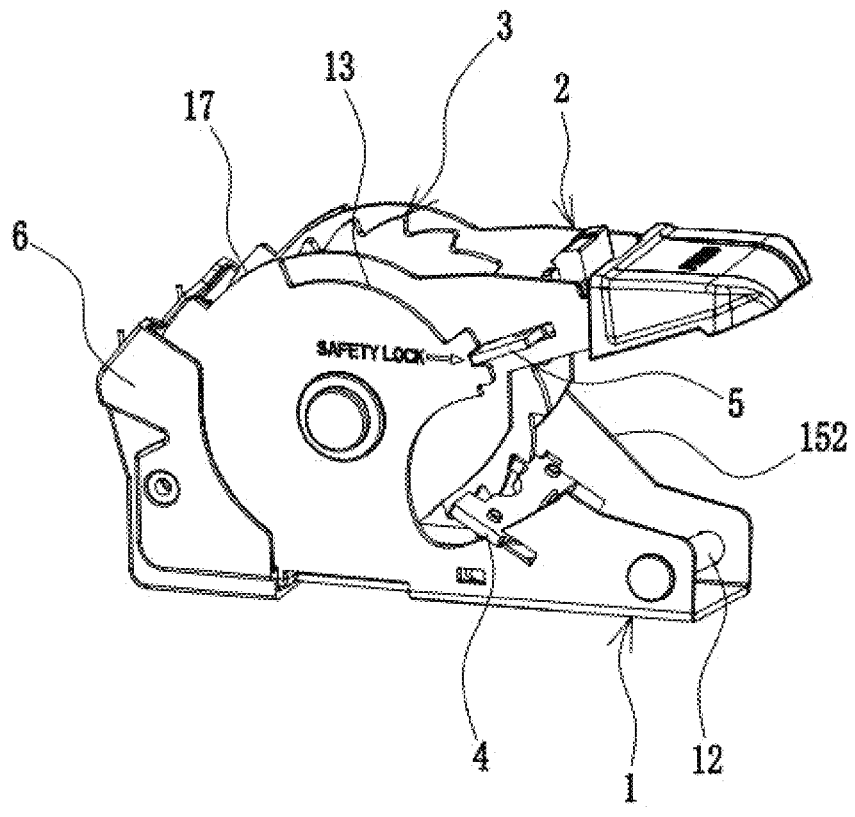
FIG. 7 is a schematic structural diagram in which a baffle plate elastically pushes and is in contact with the interior of a lock groove.

When the stopping member 5 elastically pushes and is in contact with the interior of the pulling arc groove 13 as shown in FIG. 6, in this case, the stopping member 5 is meshed with the ratchet 3, and the corresponding clamping member 4 is synchronously meshed with the ratchet 3, then the pulling handle 2 and the fastening seat 1 are operated to perform continuous reciprocating opening and closing pulling around the pulling axes, and cooperation between the stopping member 5 and the clamping member 4 can drive the ratchet 3 to form one-way intermittent forward rotation, to wind the winding end 331 of the tensioning strap 33 to realize a tensioning action of the binding end 332, that is, realize binding and tightening of the goods. When the stopping member 5 is pulled backward, crosses the rear baffle wall, and elastically pushes and is in contact with the interior of the lock groove 14 on the boss 16 as shown in FIG. 1, FIG. 2, and FIG. 7, in this case, the clamping member 4 is still meshed with the ratchet 3, and the pulling handle 2 cannot be pulled to rotate relative to the fastening seat 1.

This position is a safe position, that is, when the stopping member 5 is at the position of the lock groove 14, the entire ratchet tensioner is in the safest locked state.

Figure 8:
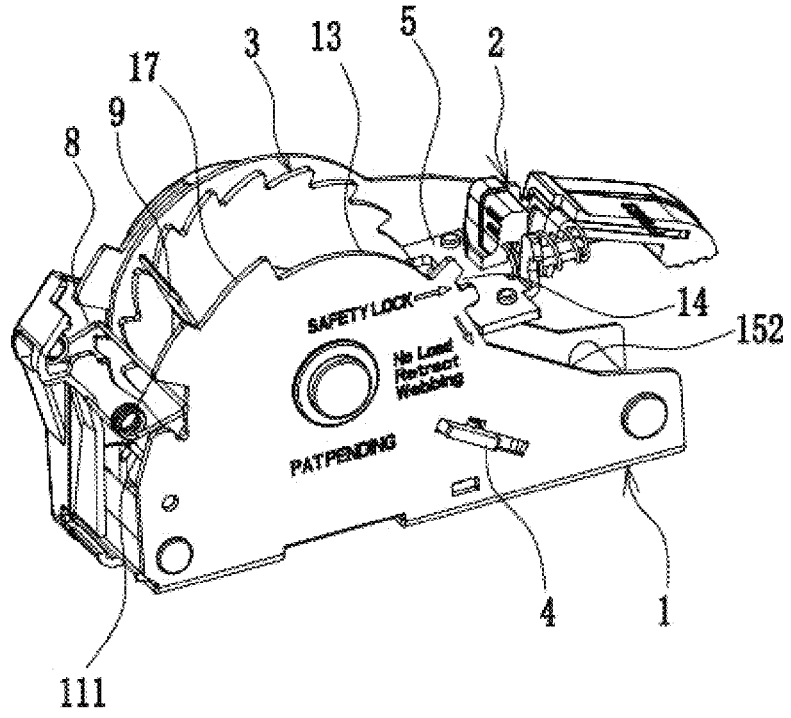
FIG. 8 is a schematic structural diagram in which a baffle plate elastically pushes and is in contact with the interior of a sliding groove.

When the stopping member 5 continues to be pulled backward and separated from the lock groove 14 to elastically push and be in contact with the interior of the sliding groove 15 as shown in FIG. 8, there will be two main situations, which are specifically: Once the pulling handle 2 is operated to be closed and pressed relative to the fastening seat 1, the stopping member 5 can be driven to slide from the locking inclined surface 151 to the pushing inclined surface 152 to be separated from the ratchet 3, the clamping member 4 is synchronously pushed by the rear cam 22 to be also separated from the ratchet 3, and the ratchet freely rotates, so that fast pulling-out of the tensioning strap 33 is completed and the coil spring assembly 7 drives the ratchet 3 to automatically wind the tensioning strap 33. Once the pulling handle 2 is released and pressed relative to the fastening seat 1, the pulling handle 2 is reset and rises, and the stopping member 5 can be driven to slide from the pushing inclined surface 152 to the locking inclined surface 151 to be meshed with the ratchet. In this case, the clamping member 4 is synchronously separated from the rear cam 22 to be meshed with the ratchet 3, thereby locking the rotation of the ratchet.

In addition, the reset torsion spring 8 on the front side of the bump 24 can also better ensure the automatic rising resetting and the resetting accuracy of the pulling handle 2. That is, the torque of the torsion spring 8 is used to drive the pulling handle 2 to automatically rise, and the baffle plate 5 is tightly attached to the front baffle wall of the sliding groove 15. In this case, complete automatic resetting is achieved, so that the structural design of the reset torsion spring 8 can ensure the smoothness, reliability, and safety of running of the baffle plate 5 in the sliding groove 15.

In addition, the objective of additionally designing the structure of the top arc groove 17 is that: in some special circumstances, if the ratchet 3 is stuck and cannot rotate freely, for example, the pulling handle 2 is operated to be closed and pressed relative to the fastening seat 1, but free rotation of the ratchet 3 cannot be completely released, in this case, the pulling handle 2 may be rotated to be opened relative to the fastening seat 1, so that the stopping member 5 elastically pushes and is in contact with the interior of the top arc groove 17, then the stopping member 5 is separated from the ratchet 3. In this case, the bump 24 is also separated from the torsion spring 8, the corresponding clamping member 4 is synchronously pushed by the front cam 21 to be separated from the ratchet 3, and the ratchet rotates freely, thereby facilitating winding and adjustment on the tensioning strap 33 by the user.

Therefore, the user only needs to operate closing and pressing or releasing and pressing of the pulling handle 2 relative to the fastening seat 1, and then fast strap releasing and automatic strap winding can be realized. In addition, the foregoing operation is a hand-held push-type operation, making the operation process easier and more effortless; and the rotation and locking of the ratchet 3 can be realized by a single-hand operation, making the use simpler and more convenient.

A damping assembly is arranged on a side of the ratchet shaft 31. The damping assembly includes a damping plate 9, a damping sheet, a damping wheel, a damping block, or the like arranged on a front side of the ratchet shaft 31. The specific structural form is not limited provided that the damping assembly can be elastically pushed to be bonded to the winding end 331 wound on the ratchet shaft 31 layer by layer.

In addition, a bonding force of the damping assembly increases as a thickness of winding layers of the winding end 331 on the ratchet shaft 31 increases, until the thickness of the winding layers can make the bonding force of the damping assembly completely restrict the ratchet 3 to stopping rotating and winding to stop the strap retracting. Certainly, as the thickness of the winding layers of the winding end 331 on the ratchet shaft 31 increases, the elastic potential energy driving the ratchet 3 to rotate is gradually released. Therefore, the gradually increasing bonding force of the damping assembly and the gradually decreasing elastic potential energy of rotation of the ratchet 3 are controlled in a suitable balanced state, then the reserved distance between the binding end 332 and the tensioner is controlled.

Figure 12:
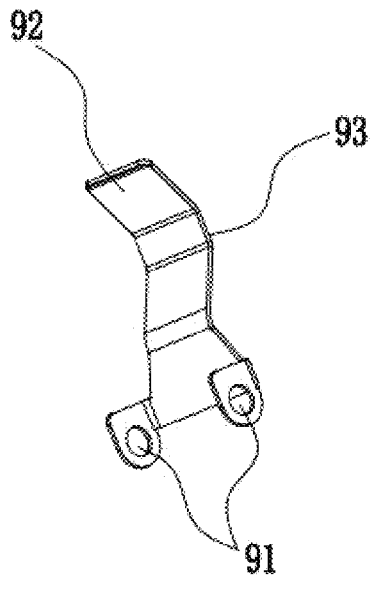
FIG. 12 is a schematic structural diagram of a damping plate in a first view direction.
Figure 13:
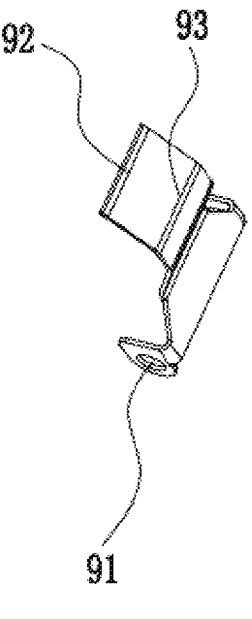
FIG. 13 is a schematic structural diagram of a damping plate in a second view direction.
Figure 14:
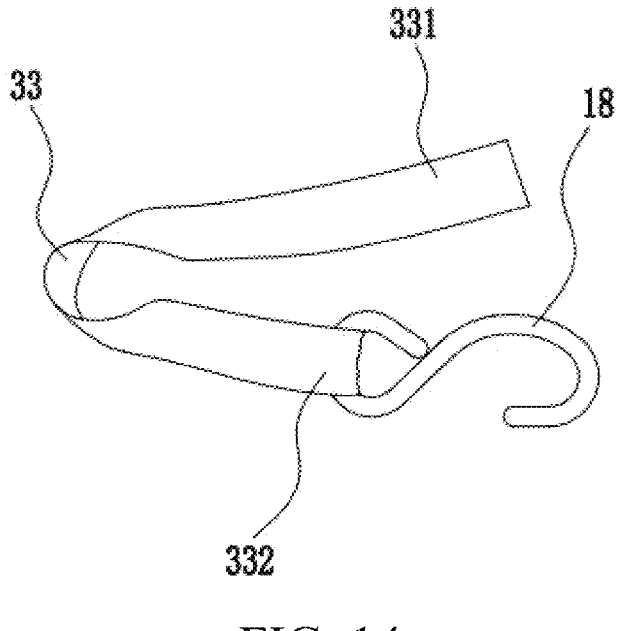
FIG. 14 is a schematic structural diagram of a tensioning strap.
Figure 15:
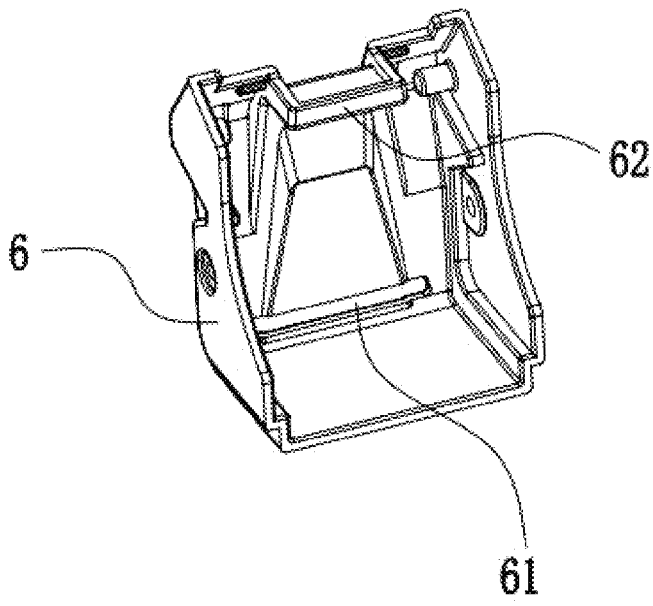
FIG. 15 is a schematic structural diagram of a sheath.

The damping plate 9 shown in FIG. 12 and FIG. 13 is used as the damping assembly of this embodiment. A lower end of the damping plate is provided with a mounting hole 91, an upper end of the damping plate is bent outward to form a pulling end 92, and a bent portion of the damping plate forms a damping convex 93 protruding toward the ratchet shaft 31; the damping plate 9 is coaxially mounted with a damping torsion spring 111 through the mounting hole 91 at the lower end, and is coaxially mounted on the guide rod 11 in this embodiment; the damping torsion spring 111 elastically pushes the damping plate 9, to drive the damping convex 93 to be bonded to the winding end 331 wound on the ratchet shaft 31 layer by layer; and the pulling end 92 pulls outward to overcome an elastic thrust force of the damping torsion spring 111, and drive the damping convex 93 to be separated from the winding end 331 wound on the ratchet shaft 31 layer by layer, and the winding end can continue to be wound on the ratchet shaft 31 driven by the elastic potential energy on the ratchet shaft 31. In addition, a limiting plate 62 needs to be arranged at a top portion of the sheath 6, and the limiting plate can restrict an outward pulling stroke of the pulling end 92.

Therefore, when the elastic potential energy accumulated on the ratchet shaft 31 drives the ratchet 3 to quickly rotate forward, to quickly wind the winding end 331 of the tensioning strap 33 on the ratchet shaft 31 layer by layer to form fast strap retracting, after the fast strap retracting drives the binding end 332 of the tensioning strap 33 to be close to the tensioner, that is, when there is still a short distance about 50 cm between the binding end 332 and the tensioner and the strap is not completely retracted, the damping assembly may quickly restrict the ratchet 3 to stopping rotating and winding to stop the strap retracting, thereby preventing the hook 18 on the binding end 332 from directly hitting or hooking the user's arm or even face as the binding end 332 is thrown around driven by a fast strap retracting force, effectively eliminating the potential safety hazard in the fast strap retracting process, and ensuring that the fast strap retracting process of the tensioning strap 33 is safer.

The foregoing descriptions are merely specific embodiments of the disclosure, and a person skilled in the art should understand that any structural design equivalent to the embodiments shall fall within the protection scope of the disclosure.

What is claimed is:

1. A safety ratchet strap tensioner, comprising a fastening seat (1), a fastening flange plate (101) at a front portion of the fastening seat, a pulling handle (2), a pulling flange plate (25) at a front portion of the pulling handle, and a ratchet (3) having a ratchet shaft (31), wherein the ratchet is coaxially rotatably mounted with pulling axes of the fastening flange plate (101) and the pulling flange plate (25) through the ratchet shaft (31); and further comprising a fixed strap
  (121) connected to the fastening seat (1), and a tensioning strap (33) of which one end is wound and connected to the ratchet shaft (31) as a winding end (331) and the other end forms a binding end (332), wherein a clamping member (4) that elastically pushes and is in contact with an outer circumference of the pulling flange plate (25) is arranged in the fastening seat (1), and a stopping member (5) that elastically pushes and is in contact with an outer circumference of the fastening flange plate (101) is arranged in the pulling handle (2); both the clamping member
  (4) and the stopping member (5) are clamped with the ratchet (3), and the ratchet is pulled by continuous reciprocating opening and closing of the pulling handle (2) relative to the fastening seat (1) to form one-way intermittent forward rotation, to wind the winding end (331) of the tensioning strap (33) on the ratchet shaft (31) layer by layer to form slow strap retracting and tensioning; the clamping member (4) and the stopping member (5) are completely separated from the ratchet (3), and the binding end (332) of the tensioning strap (33) applies an outward pulling force to drive the ratchet (3) to quickly rotate reversely, to quickly rotate and release the winding end (331) wound on the ratchet shaft (31) layer by layer to form fast strap releasing, and synchronously accumulate elastic potential energy on the ratchet shaft (31), wherein a damping assembly is arranged on a side of the ratchet shaft (31), the elastic potential energy synchronously accumulated on the ratchet shaft (31) drives the ratchet (3) to quickly rotate forward, to quickly wind the winding end (331) of the tensioning strap (33) on the ratchet shaft
  (31) layer by layer to form fast strap retracting, and after the fast strap retracting drives the binding end (332) of the tensioning strap (33) to be close to the tensioner, the damping assembly quickly restricts the ratchet (3) to stopping rotating and winding to stop the strap retracting.

2. The safety ratchet strap tensioner according to claim 1, wherein the damping assembly comprises a damping plate (9) or damping sheet or damping wheel or damping block arranged on a front side of the ratchet shaft (31), the damping assembly is elastically pushed to be bonded to the winding end (331) wound on the ratchet shaft (31) layer by layer, and a bonding force of the damping assembly increases as a thickness of winding layers of the winding end (331) on
  the ratchet shaft (31) increases, until the bonding force of the damping assembly completely restricts the ratchet (3) to stopping rotating and winding to stop the strap retracting.

3. The safety ratchet strap tensioner according to claim 2, wherein a lower end of the damping plate (9) is provided with a mounting hole (91), an upper end of the damping plate is bent outward to form a pulling end (92), and a bent portion of the damping plate forms a damping convex (93) protruding toward the ratchet shaft (31); the damping plate (9) is coaxially mounted with a damping torsion spring (111) through the mounting hole (91) at the lower end, and the damping torsion spring (111) elastically pushes the damping plate (9), to drive the damping convex (93) to be bonded to the winding end (331) wound on the ratchet shaft (31) layer by layer; and the pulling end (92) pulls outward to overcome an elastic thrust force of the damping torsion spring (111), and drive the damping convex (93) to be separated from the winding end (331) wound on the ratchet shaft (31) layer by layer, and the winding end continues to be wound on the ratchet shaft (31) driven by the elastic potential energy on the ratchet shaft (31).

4. The safety ratchet strap tensioner according to claim 3, wherein a sheath (6) fixed by sleeving is arranged on a front side of the fastening flange plate (101), the sheath is provided with a strap pass-through hole (61) for the binding end (332) to freely pass through, a limiting plate (62) is arranged at a top portion of the sheath (6), and the limiting plate restricts an outward pulling stroke of the pulling end (92).

5. The safety ratchet strap tensioner according to claim 1, wherein a sliding groove (15) higher than the ratchet (3) is provided at a rear portion of the outer circumference of the fastening flange plate (101), and a locking inclined surface (151) and a pushing inclined surface (152) that are integrally connected are provided in the sliding groove; a rear cam (22) higher than the ratchet (3) is arranged at a rear portion of the outer circumference of the pulling flange plate (25); the stopping member (5) elastically pushes and is in contact with the interior of the sliding groove (15), and the pulling handle (2) is closed and pressed relative to the fastening seat (1), to drive the stopping member (5) to slide from the locking inclined surface (151) to the pushing inclined surface (152) to be separated from the ratchet (3), the clamping member (4) is synchronously pushed by the rear cam (22) to be also separated from the ratchet (3), and the ratchet freely rotates; and the pulling handle (2) is released and pressed relative to the fastening seat (1), the pulling handle (2) is reset and rises, to drive the stopping member (5) to slide from the pushing inclined surface (152) to the locking inclined surface (151) to be meshed with the ratchet, the clamping member is synchronously separated from the rear cam (22) and is also meshed with the ratchet (3), and the ratchet is restricted from rotation.

6. The safety ratchet strap tensioner according to claim 1, wherein a front cam (21) and a bump (24) that are higher than the ratchet (3) are arranged at a front portion of the outer circumference of the pulling flange plate (25), a reset torsion spring (8) is arranged on a front side of the bump, and the reset torsion spring elastically presses down the bump (24) to drive the pulling handle (2) to rise and be reset.

7. The safety ratchet strap tensioner according to claim 6, wherein a top arc groove (17) higher than the ratchet (3) is provided at a front portion of the outer circumference of the fastening flange plate (101), a front baffle wall is arranged on a front side of the top arc groove (17), a pulling arc groove (13) lower than the top arc groove (17) and the ratchet (3) is provided at a middle portion of the outer circumference of the fastening flange plate (101), and a lock groove (14) higher than the ratchet (3) is provided between the pulling arc groove (13) and the sliding groove (15).

8. The safety ratchet strap tensioner according to claim 7, wherein the pulling handle (2) rotates to be opened relative to the fastening seat (1), the stopping member (5) elastically pushes and is in contact with the interior of the top arc groove (17) to be separated from the ratchet (3), the corresponding clamping member (4) is synchronously pushed by the front cam (21) to be also separated from the ratchet (3), and the ratchet freely rotates.

9. The safety ratchet strap tensioner according to claim 7, wherein the stopping member (5) elastically pushes and is in contact with the interior of the lock groove (14), the corresponding clamping member (4) is meshed with the ratchet (3), and the pulling handle (2) is incapable of being pulled to rotate relative to the fastening seat (1).

10. The safety ratchet strap tensioner according to claim 7, wherein the stopping member (5) elastically pushes and is in contact with the interior of the pulling arc groove (13) to be meshed with the ratchet (3), the corresponding clamping member (4) is synchronously meshed with the ratchet (3), the pulling handle (2) and the fastening seat (1) perform continuous reciprocating opening and closing pulling around the pulling axes, and cooperation between the stopping member (5) and the clamping member (4) drives the ratchet (3) to form one-way intermittent forward rotation, to wind the winding end (331) of the tensioning strap (33) on the ratchet shaft (31) layer by layer to form slow strap retracting and tensioning.

* * * * *